United States Patent [19]

Weber et al.

[11] 4,159,063
[45] Jun. 26, 1979

[54] LID CATCH FOR SUPERPRESSURIZED CONTAINERS

[75] Inventors: Hans R. Weber, Rothrist; Karl Bosch, Olten, both of Switzerland

[73] Assignee: Niroplan AG, Zug, Switzerland

[21] Appl. No.: 930,025

[22] Filed: Aug. 1, 1978

[30] Foreign Application Priority Data

Aug. 10, 1977 [CH] Switzerland .................. 9785/77

[51] Int. Cl.² .................. B65D 45/00; B65D 51/18
[52] U.S. Cl. .................. 220/316; 220/323; 220/256
[58] Field of Search .................. 220/316, 3, 240, 256, 220/323

[56] References Cited

U.S. PATENT DOCUMENTS

| | | | |
|---|---|---|---|
| 1,858,013 | 5/1932 | Heins | 220/316 |
| 2,102,962 | 12/1937 | Ludington | 220/61 |
| 2,793,787 | 5/1957 | Lescure | 220/323 |
| 3,780,904 | 12/1973 | Stanford | 220/316 |

FOREIGN PATENT DOCUMENTS

| | | |
|---|---|---|
| 181034 | 7/1954 | Austria. |
| 1949354 | 7/1966 | Fed. Rep. of Germany. |
| 2127099 | 6/1972 | Fed. Rep. of Germany. |
| 2303123 | 9/1973 | Fed. Rep. of Germany. |
| 2555152 | 6/1977 | Fed. Rep. of Germany. |
| 1574771 | 7/1969 | France. |
| 348799 | 10/1960 | Switzerland. |
| 440612 | 12/1967 | Switzerland. |

*Primary Examiner*—William Price
*Assistant Examiner*—Steven M. Pollard
*Attorney, Agent, or Firm*—Sherman & Shalloway

[57] ABSTRACT

A lid catch on a container driven with superpressure is disclosed. A prestressed spring catch bolt is held in an engaged position due to the pressure exerted on an inner lid of the container which is transmitted by a counterpoise to the bolt. Therefore, releasing of the lid when the container is pressurized is impossible.

15 Claims, 8 Drawing Figures

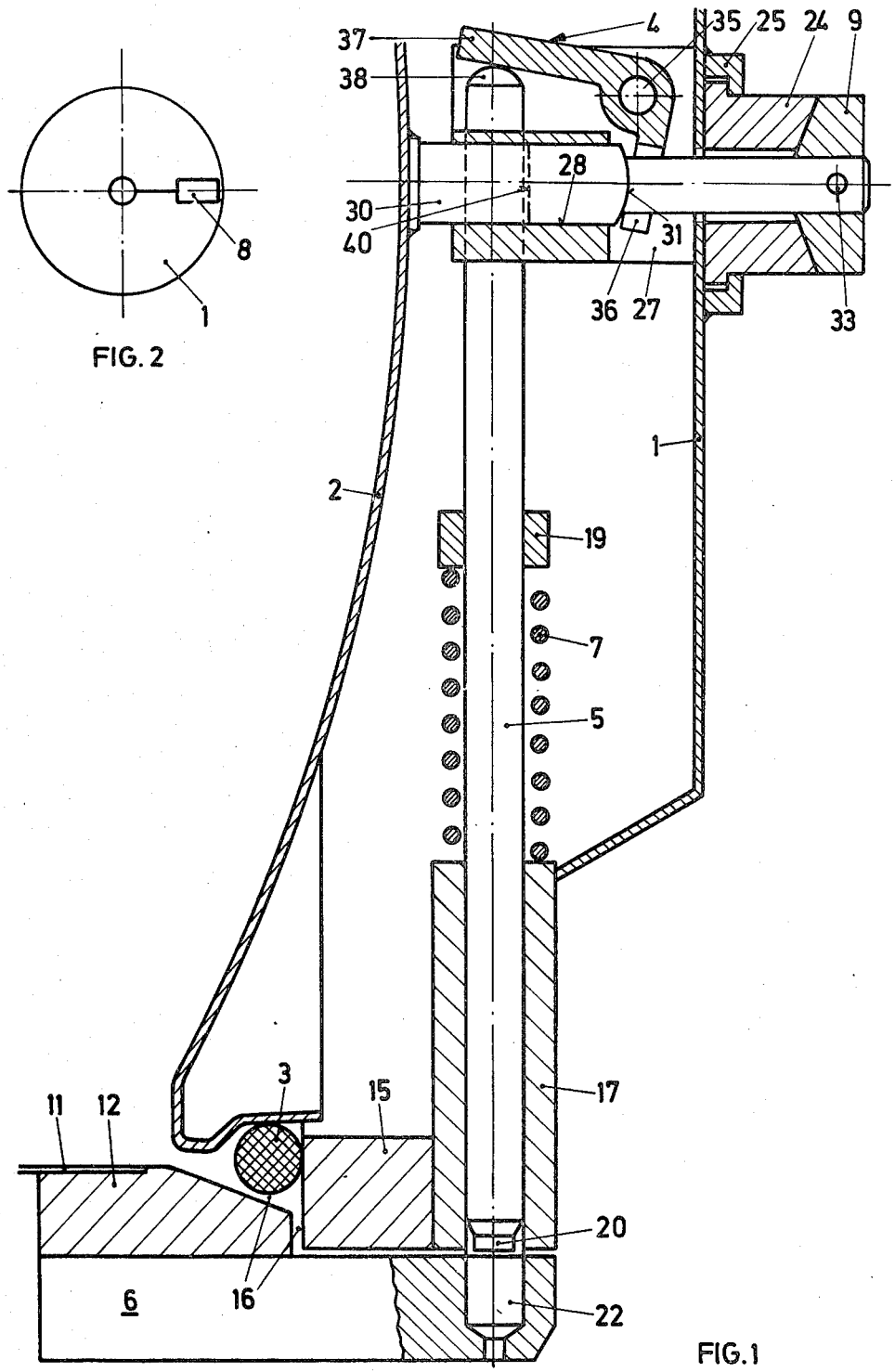

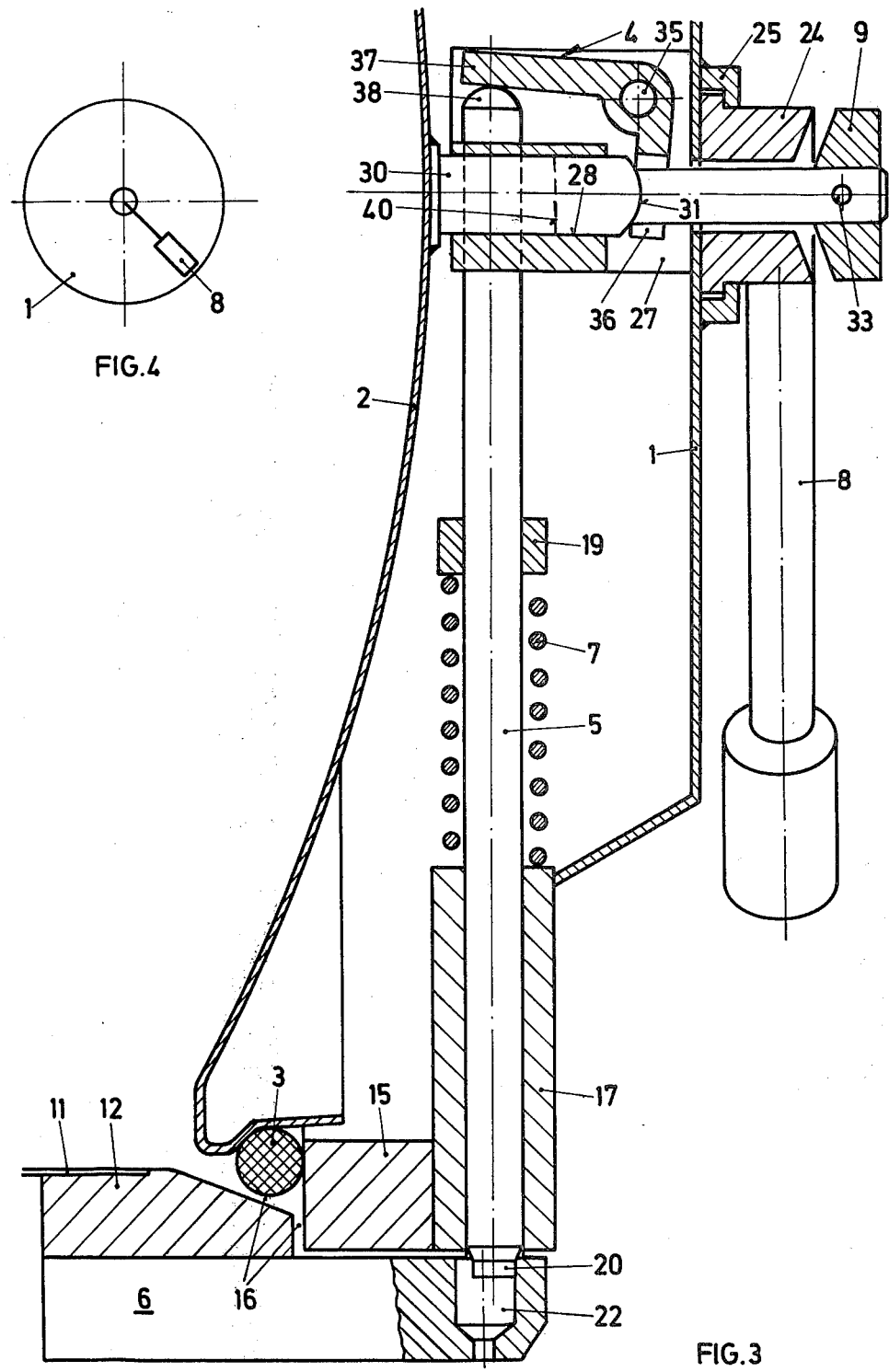

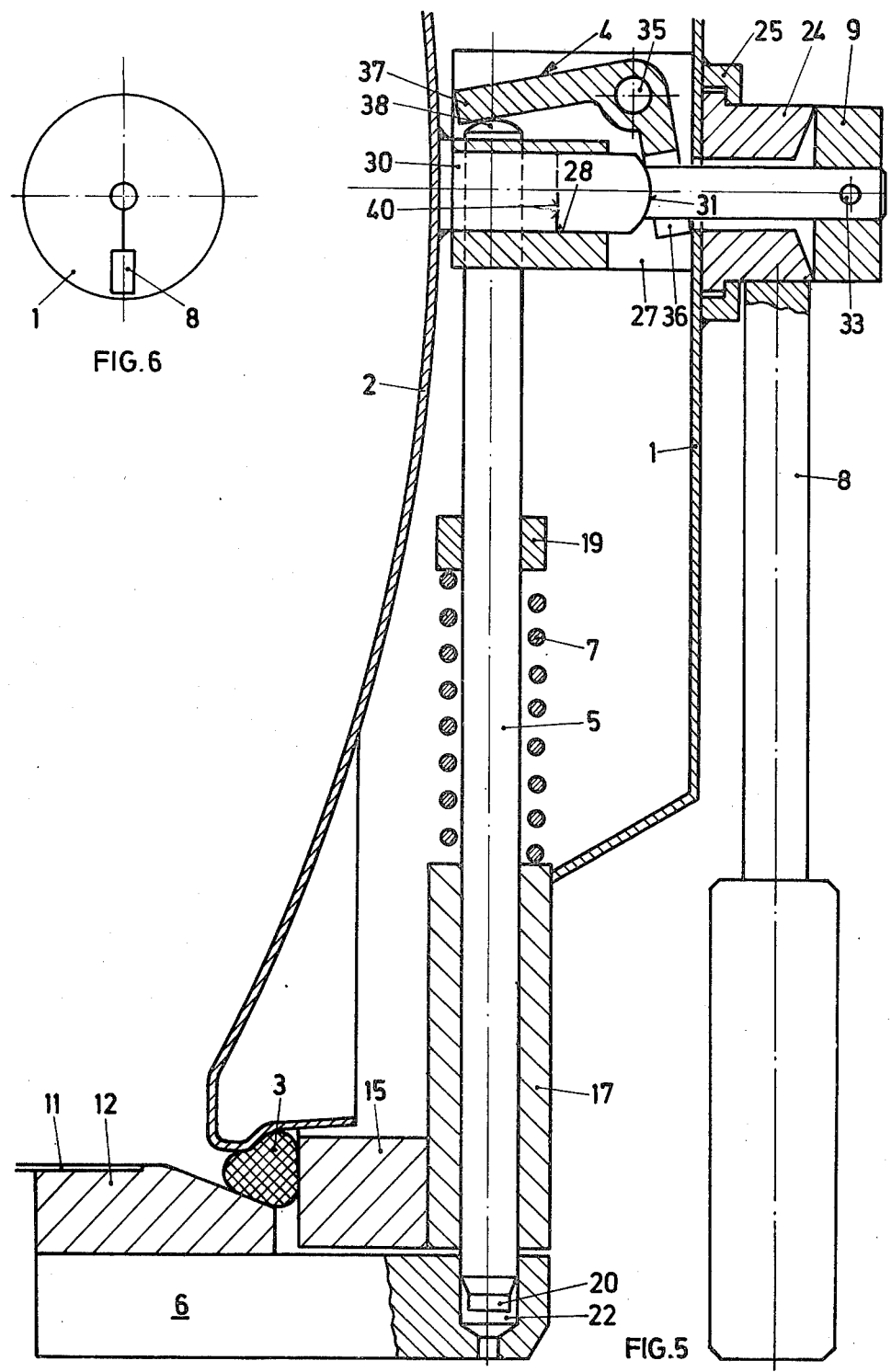

LID CATCH FOR SUPERPRESSURIZED CONTAINERS

BACKGROUND OF THE INVENTION

1. Field of the Invention

The present invention is concerned with a lid catch with a lid safety stop on a container driven with superpressure. The lid catch has a spring-prestressed catch bolt opposite a recess in a part of the container to receive the free end of the bolt. Means of activation are provided for moving the catch bolt which comprise prestressed spring means to open the bolt controlled by pressure inside the container.

2. Description of the Prior Art

Many such lid catches are known which, however, do not satisfy the current requirements as far as safety or reliability is concerned, or which are extremely complicated in their construction and, therefore, are expensive and susceptible to problems.

Thus, for example, a safety device on a steam-pressure cooking vessel with a closing element for shutting off its interior space is known in which means reacting to the pressure in the interior space are located in that space which latch the closing element when a predetermined pressure in the interior space of the container is exceeded. For this purpose, this design makes use of a complicated multiple-lever system whose levers are connected firmly with each other, so that the catch element always remains connected to those parts which push it into its safety position. This is not professionally desired and is avoided by the invention which is formulated below.

SUMMARY OF THE INVENTION

Lid catches for pressure containers are described which are simple in construction and reliable in operation. As long as a predetermined internal pressure exists on an internal lid, a bolt which locks the lid to the container cannot be disengaged. This is because pressure on the lid is transmitted by a counterpoise which results in the bolt being retained in an engaged position. The bolt is initially engaged by means of a V-belt pulley and V-belt pulley counterpart. Once the container is pressurized, the V-belt pulley is disengaged. Therefore, release of the bolt while the container is pressurized is not possible. An O-ring is provided to seal the lid to the container and the bolt is spring biased.

It is an object of this invention to provide a lid catch for superpressurized containers which is held in the engaged position by the internal pressure in the container.

It is a further object of the present invention, basically, to provide a lid catch for a container which makes it impossible to open the container when it is under adjustable inner pressure.

BRIEF DESCRIPTION OF THE DRAWINGS

FIG. 1 is a longitudinal section through the upper part of a container with a closed, but not locked, lid having a catch bolt according to the invention;

FIG. 2 is a top view of the lid in FIG. 1 showing the position of the latching lever;

FIG. 3 is a section similar to FIG. 1 in which the lid is closed and the latch locking bolt, with its top, is pulled into the safety position;

FIG. 4 is a top view of the lid in FIG. 3 showing the position of the latching lever;

FIG. 5 is a longitudinal section in conformity with FIG. 1, in which the lid is closed and latched, and consequently the container is sealed tight;

FIG. 6 is a top view of the lid showing the attitude of the latching lever in the closed and latched position of FIG. 5;

DETAILED DESCRIPTION OF THE PREFERRED EMBODIMENT

Figure 7:
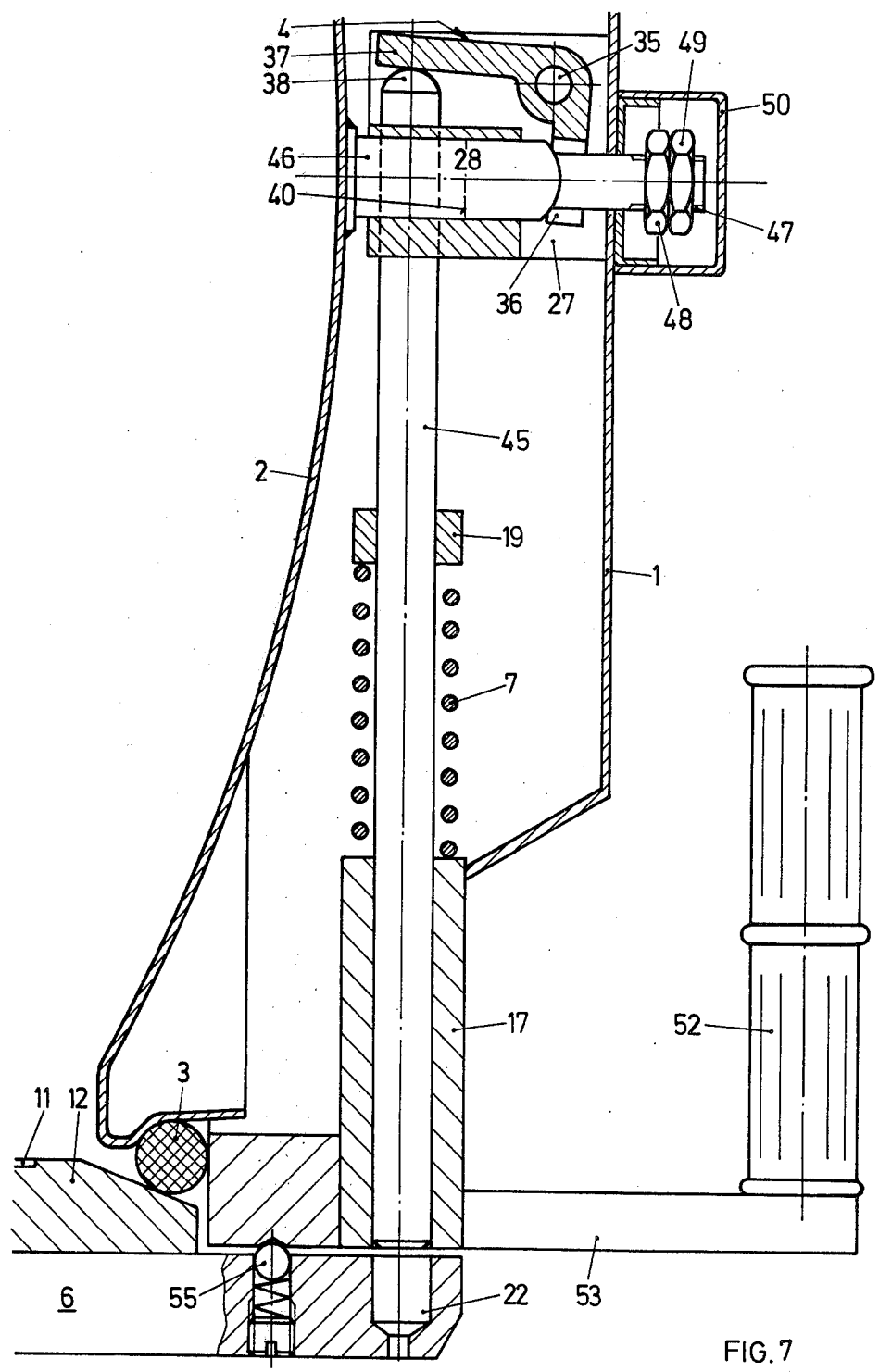
FIG. 7 is a longitudinal section of another embodiment of a catch with closed lid in the unlatched position.

FIGS. 1, 3 and 5 show the upper part of a container with an exterior lid 1 and an interior lid 2. Furthermore, an O-ring type of round gasket or seal 3 can be seen which seals the lid 2 to a flange 12 of a container wall 11.

On the wall 11 of the container, an edge or a peripheral flange 12 is shown as an upper seal to which a closing cover plate or extension 6 is fastened. The exterior lid 1 has a counterflange 15 to the edge flange 12. The lid shoulder of the interior lid 2, together with the edge flange 12 and the counterflange 15, determines an annulus for receiving the seal 3, which provides a free ring slot in the unlatched condition of the interior lid 2, as FIGS. 1 and 3 show. A guide sleeve 17 is fastened to the counterflange 15 of the exterior lid 1 to guide the latch locking bolt 5, and one of its ends serves as a support for a spiral spring 7, while the other end of the spiral spring 7 is supported on a spring cap or collar 19 which preferably has a controllable position by a winding, set screw or thread, for example, or in some other familiar way, in order to adjust the spring tension acting on the latch locking bolt 5. One end 20 of the latch locking bolt 5 is tapered and is smaller in diameter than the bolt 5. Opposite this tapered end 20, a drilled hole or recess 22 is located in the closing cover plate 6 which, as is shown in FIG. 5, serves to receive the forward portion of the latch locking bolt 5.

An activating or control bolt 30, welded to the interior lid 2, has a shoulder 31 which supports a V-belt pulley counterpart 9 by means of a pin 33. A V-belt pulley 24 is supported, so that it can rotate, in a supporting rim 25 which is welded to the exterior lid 1. A guide part 27 is fastened to the inside of the exterior lid 1, which has a drilled hole 28 to receive the interior-lid-activating bolt 30, which can be pushed into it. Furthermore, an L-shaped lever, such as a counterpoise 4, is fastened for rotation with respect to the guide part 27 by means of a bolt 35. One leg 36 of the counterpoise 4 is connected with the bolt 30 through its shoulder 31 in a work connection, while the other leg 37 lies loose on the curved end 38 of the latch locking bolt 5. Furthermore, the bolt 5 is conducted loosely in a slotted or oblong hole 40 of the guide part 27.

After the material to be treated has been placed into the container, the exterior lid 1 and the interior lid 2, which are suitable connected together, are closed in such a way that they assume the position represented in FIG. 1. The lid 2 is closed, indeed, but not latched. The latching lever 8 is in the horizontal position as shown in FIG. 2. In order to bring the lids 1 and 2 into the position shown in FIG. 1 from the open state of the container, the latch locking bolt 5 must be in the fully-retracted position in the guide sleeve 17. Then the seal 3 is not pressed against the corresponding sealing surfaces of the edge flange 12 and the counterflange 15 by the lid shoulder of the lid 2. In this position, steam that occurs in the container can escape through the gap between the seal 3 and the sealing surfaces, and a building up of pressure in the container is impossible.

To achieve the position that can be seen in FIG. 3, the latching lever 8 must be swiveled from its original, horizontal position (FIG. 2). The V-belt pulley 24 is rotated by the swiveling movement of the lever 8, such rotation causing the V-belt pulley counterpart 9 to raise away from the pulley 24. This results in the activating bolt 30 and the lid 2 being raised by the bolt 33 and pulled toward the exterior lid 1. The shoulder 31, which is displaced by the counterpoise 4 swivels, grasps the latch locking bolt 5 at its end 38 and pushes it into the position that is seen in FIG. 3. If the lids 1 and 2 are only partially closed, as is shown in FIG. 3, the latch locking bolt 5 has not been completely introduced into the drilled hole 22. Then the displaced locking bolt end 20 is standing too close to one wall of the drilled hole 22. But even in this position, safety is fully guaranteed, since the steam can escape through the gap 16, which is still open, and a building up of pressure in the container is made impossible by that means.

A reopening of the lid is prevented when the latching lever 8 is in the position shown in FIG. 4. In that position, the lid 2 is closed and the latching lever 8 is in the swung-out position. The tapered end 20 of the latch locking bolt 5 is introduced into the drilled hole 22 of the closing cover plate 6. By lifting the interior cover's activating bolt 30, the lid 2 is drawn against the exterior lid 1, but without closing the gap 16. In terms of safety technology, the position represented in FIGS. 3 and 4 is distinguished by the following.

The latch locking bolt 5 is partially introduced into the drilled hole 22 of the cover plate 6. A further swiveling of the latching lever 8, therefore, necessarily results in the latching of the entire lid structure.

The locking bolt end 20 that is introduced into the cover plate drilled hole 22 results in a free space for movement between the seal 3 and the sealing surfaces of the edge flange 12 and the counterflange 15, and consequently, even a small buildup of pressure that occurs will move the entire lid 2 until the locking bolt end 20 strikes the wall of the drilled hole 22. As a result, the free cross section in the form of the gap 16 between the seal and the sealing surfaces necessarily occurs again. Thus the steam can still escape freely, and consequently, a dangerous building up of pressure is also impossible in this position.

If the latching lever 8 is now swiveled farther, in its vertical aspect, in the position shown in FIG. 6, the counterpoise 4 is further swung out above the leg 36 in the direction illustrated (FIG. 5), so that the other leg 37 pushes the latch locking bolt 5 into the opening 22 which corresponds to its diameter. This opening brings about a latching of the lid structure 1, 2 with the cover plate 6. At the same time, the interior lid 2 is drawn further into the counterflange 15 by the V-belt pulley 24 and the V-belt pulley counterpart 9, and as a result, the seal 3 is compressed against the shoulder of the lid 2 and pressed against the sealing surfaces, as is shown effectively in FIG. 5. Now the container is latched so that it is secure against pressure, and pressure can build up in its interior without any danger. This pressure that builds up within the container will burden the interior lid 2 and force it toward the outside and the exterior lid 1, thereby increasing the pressure on the counterflange 15 by way of the round gasket 3. As a result, an increasing surface pressure of the latch locking bolt 5 on the wall of the drilled hole 22 also occurs with growing internal pressure. In addition, the bolt 5 is necessarily pressed further into the drilled hole 22.

Simultaneously, the V-belt pulley counterpart 9 is lifted out of the V-belt pulley 24 by the activating bolt 30, and the power connection between the V-belt pulley counterpart 9 and the latching lever 8 and/or the V-belt pulley 24 is thereby disengaged. Therefore, the latching lever 8 can rotate freely, and it falls into the vertical position in every case. Consequently, the latching function can no longer be influenced by moving the lever 8. By this means, opening the lids 1 and 2 of the container which is under pressure is rendered impossible.

Before it is possible to open the lids 1 and 2, the pressure in the container must be lowered by means of a release valve (not shown), and this can take place automatically, being made dependent upon a roasting or boiling time set on a time clock, for example. The declining pressure in the container brings about:

(a) A releasing of the load of the interior lid 2 when the latching lever 8 is in the vertical position, and consequently the resting of the V-belt pulley counterpart 9 on the V-belt pulley 24 again. As a result, the final position, achieved without any human intervention, corresponds to the position shown in FIG. 5.

(b) A releasing of the load of the interior lid 2 by a lowering of the pressure, with the latching lever 8 being deliberately brought to its horizontal position, or with the latching lever 8 being swiveled into that position after almost complete, but insufficient, lowering of the pressure. As a consequence, the V-belt pulley counterpart 9 is again engaged by the V-belt pulley 24 of the latching lever 8, slowly and in accordance with the lowering of the pressure in the container, by means of the activating bolt 30, and finally the position of these parts as shown in FIG. 1 is attained.

However, removal of the latch locking bolt 5 from the drilled hole 22 of the cover plate 6 by human force during this process is not possible, since there is no frictional connection to provide an opening action between the latching lever 8 through the V-belt pulley 24 and the counterpart 9 which, in turn, is transmitted to the bolt 30 and the counterpoise 4 with the latch locking bolt 5.

In the process of opening, the latch locking bolt 5 is forced out of the cover plate drilled hole 22 by the spring 7, which is preadjusted at the factory and which is not accessible to a layman. This pulling out of the latch locking bolt 5 is set so that it is only possible when the lid 2 is released of the load to such an extent that a free gap 16 has formed between the seal 3 and the sealing surfaces again, as a result of which the bolt 30 and the counterpoise 4 establish a free opening path again which the spring 7 uses for pulling back the bolt 5.

Furthermore, the frictional resistance between the latch locking bolt 5 and the wall of the cover plate drilled hole 22 must be reduced to the extent that, by releasing pressure in the interior of the container, the power of the spring 7 is able to overcome the frictional resistance. By having the ability to adjust the power of the spring 7, it can be determined at what small excess pressure in the container the latch locking bolt 5 is to be pushed out of its safety position—that is, out of the opening 22—by the spring 1. This can be made possible at an excess pressure of 150 mm W.S. (water column), for example, since that pressure no longer acts to endanger safety.

Figure 8:
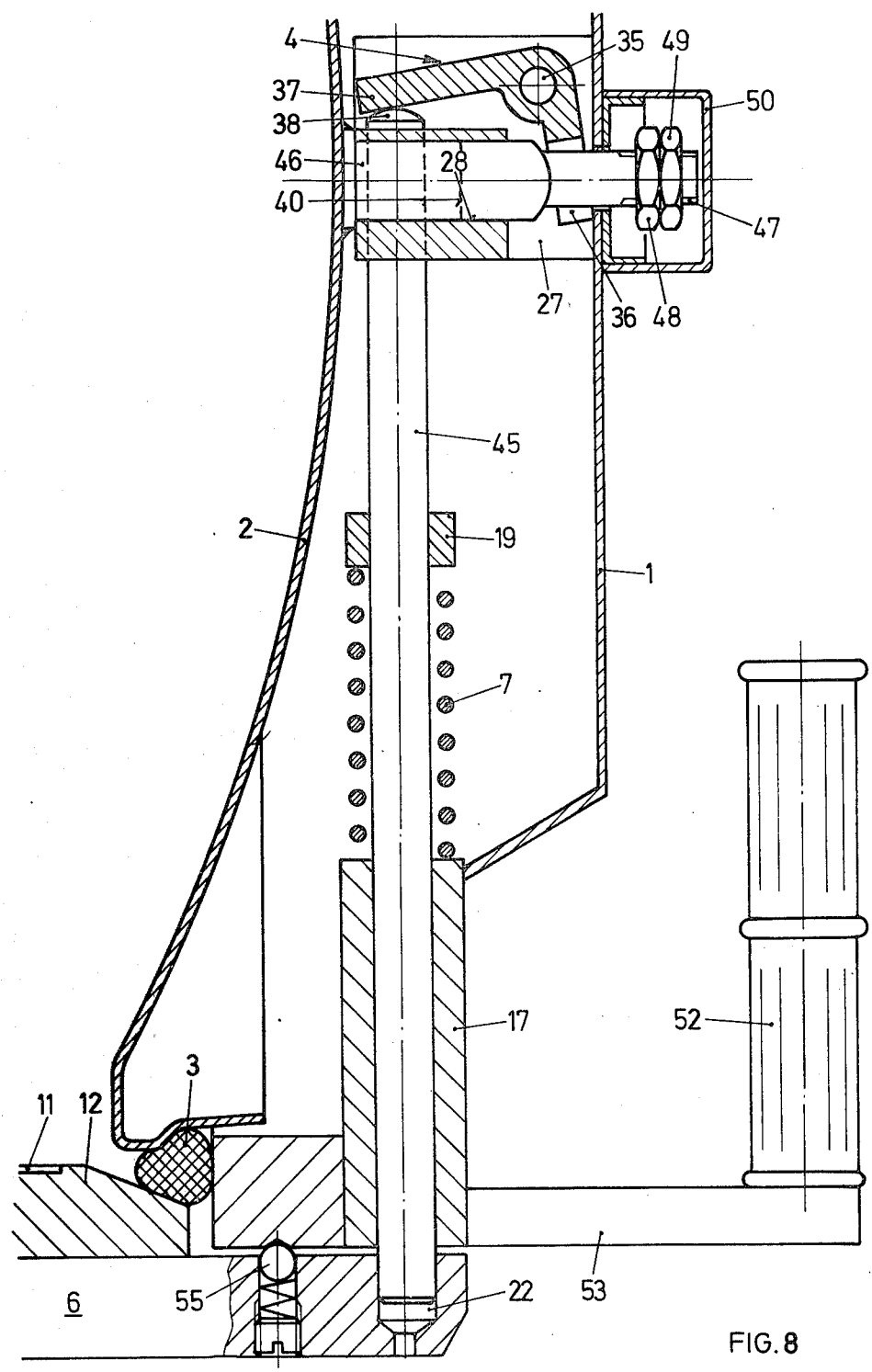
FIG. 8 is a sectional similar to FIG. 7, with the lid latched.

In the lid latching of FIGS. 7 and 8, the parts which coincide with the parts of the embodiment previously described have the same reference numbers. In this design, the latch locking bolt 45 is not displaced by manual movement at the forward safety end. Instead, the action of locking the bolt is automatic. A bolt 46, corresponding to the interior-lid activating bolt 30 has a winding 47 at its free end on which there are a nut 48 and a lock nut 49. This part is closed by means of a cover 50. A handle 52 is fastened to the guide box 17 by means of an arm 53. When the interior lid 2 is in its closed position, a spring-loaded stop sphere 55 engages in a corresponding slot of the counterflange 15. The sphere 55 holds the lid in place to allow pressure build up in the container which, in turn, activates the bolt 45.

When in the closed, but not secured, position of the lid as in FIG. 7, the pressure in the interior of the container rises, the bolt 46 is pushed outward and the latch locking bolt 45 is pushed into the opening 22 of the latching cover plate 6 by the counterpoise 4, as is shown in FIG. 8. As the pressure increases, not only will the end of the locking bolt go deeper into the opening 22 but, as has been explained, the surface pressure on the wall of the drilled hole 22 will also rise. The interior lid 2 is also pushed more and more against the counterflange 15, and as a result the sealing pressures on the seal 3 is increased, and consequently, the sealing is improved. After the operation of the container is complete, the internal pressure is reduced here, too, by a suitably controlled exhaust valve, long enough for the power of the spring 7 to return the latch locking bolt 45 to its original position (FIG. 7).

In the embodiment, both the latching and the unlatching take place automatically, with the internal pressure building up in the container, instead of the latching lever 8, pushing the latch locking bolt 5 into the opening 22 of the latching cover plate 6 through the means of the interior lid 2, in the manner that has been described.

What is claimed is:

1. A lid catch for superpressurized containers having a recess for receiving a bolt comprising:
   (a) an interior cover for communicating with pressure in the container;
   (b) an exterior cover located adjacent said interior cover;
   (c) a bolt disposed between said interior cover and said exterior cover;
   (d) a resilient means for retaining said bolt in a normally open position;
   (e) means for moving said interior cover toward said exterior cover; and
   (f) means for moving said bolt to engage the recess in the container in response to movement of the interior cover toward the exterior cover caused by said means for moving.

2. The lid catch of claim 1, wherein said means for moving said interior cover towards said exterior cover comprises a member which is attached to the interior cover having an end which passes through said exterior cover, said member having a shoulder, a V-shaped pulley rotatably connected to said exterior cover and located about the end of the member extending through the exterior cover, and a V-shaped pulley counterpart connected to the end of the member extending through the exterior cover and engaging the V-shaped pulley whereby rotation of said V-shaped pulley causes said V-shaped pulley counterpart to pull said member and said interior cover towards said exterior cover resulting in the shoulder causing said counterpoise to rotate which, in turn, forces said bolt to engage the recess in the container.

3. The lid catch of claim 2, wherein said means for moving said bolt to engage the recess comprises a counterpoise having a first end which engages said shoulder and a second end which engages the bolt, said counterpoise being hingedly supported by said exterior cover.

4. The lid catch of claim 1, wherein said means for moving said bolt to engage the recess comprises a counterpoise having a first end which engages said interior cover and a second end which engages the bolt, said counterpoise being hingedly supported by said exterior cover.

5. The lid catch of claim 1, wherein said means for moving said interior cover towards said exterior cover comprises a member which is attached to the interior cover having an end which passes through said exterior cover, said member having a shoulder, and a means for locking the position of said exterior cover with respect to the container so that pressure in the container forces said interior cover to move toward said exterior cover and said member guides the movement of said interior cover toward said exterior cover.

6. The lid catch of claim 5, wherein said means for moving said bolt to engage the recess comprises a counterpoise having a first end which engages said shoulder and a second end which engages the bolt, said counterpoise being hingedly supported by said exterior cover.

7. The lid catch of claim 6, wherein said means for locking is a spring-loaded sphere and said exterior cover has a recess which engages said sphere.

8. The lid catch of claim 7, wherein an end of the bolt which engages the recess of the container is tapered.

9. The lid catch of claim 8, wherein a seal is provided around a periphery of the interior cover.

10. The lid catch of claim 9, wherein said interior cover is provided with a counterflange and said seal engages the container, the counterflange and the periphery of the interior cover when said bolt is in a locking condition.

11. The lid catch of claim 9, wherein said seal engages a counterflange of the exterior cover and the container only when said bolt is in a locked condition and said seal does not allow pressure build up in the container if only the tapered end of the bolt engages the recess in the container.

12. The lid catch of claim 3, wherein an end of the bolt which engages the recess of the container is tapered.

13. The lid catch of claim 12, wherein a seal is provided around a periphery of the interior cover.

14. The lid catch of claim 13, wherein said interior cover is provided with a counterflange and said seal engages the container, the counterflange and the periphery of the interior cover when said bolt is in a locking condition.

15. The lid catch of claim 13, wherein said seal engages a counterflange of the exterior cover and the container only when said bolt is in a locked condition and said seal does not allow pressure build up in the container if only the tapered end of the bolt engages the recess in the container.

* * * * *